(No Model.)

D. E. SWEETSER.
APPARATUS FOR PRESERVING FRUIT, VEGETABLES, &c.

No. 248,678. Patented Oct. 25, 1881.

Witnesses:
John Palmer
Emmerson Jones.

Inventor:
Dwight E. Sweetser.
per Edw. W. Woun
Atty.

UNITED STATES PATENT OFFICE.

DWIGHT E. SWEETSER, OF MONTAGUE, MASSACHUSETTS.

APPARATUS FOR PRESERVING FRUIT, VEGETABLES, &c.

SPECIFICATION forming part of Letters Patent No. 248,678, dated October 25, 1881.

Application filed August 17, 1881. (No model.)

*To all whom it may concern:*

Be it known that I, DWIGHT E. SWEETSER, of Montague, in the county of Franklin and Commonwealth of Massachusetts, have invented a new and useful Improvement in Apparatus for Preserving Fruit, Vegetables, and other Perishable Substances, of which the following is a true and complete specification.

My invention relates to apparatus which is air and water tight, and where the article is preserved by the exclusion of air, and is as nearly a perfect vacuum as it is possible to obtain.

Figure 1:
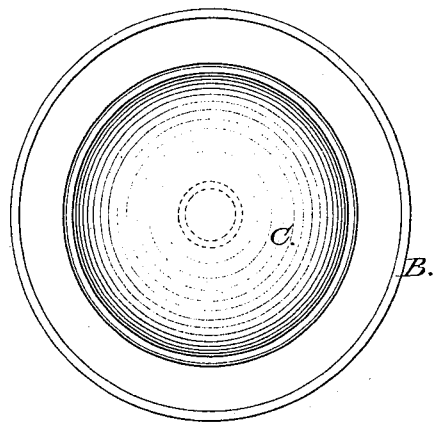
Figure 2:
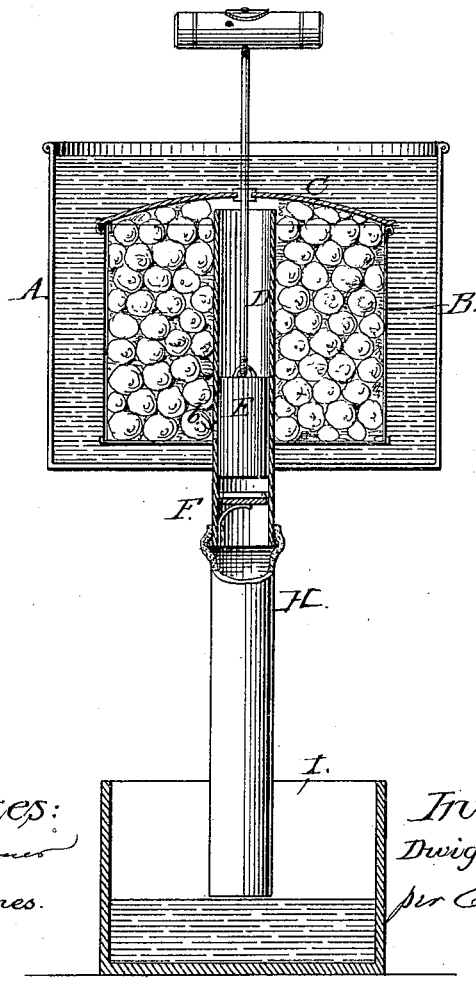

In my drawings, Figure 1 is a plan view of the vessels composing, in part, my apparatus. Fig. 2 is a vertical central section, showing the apparatus complete.

The accompanying drawings represent the invention, in which A is a water-tight vessel; B, an inside vessel to hold the fruit, somewhat smaller than the outside, A, to allow a film of water surrounding it on all sides, the bottom being above the bottom of A, and the cover C of B being air-tight. Through the center of both vessels runs a tube, D, vertically, closely fastened to the bottoms of both. To the lower end of this tube may be attached a rubber tube, H, to enter a water-receptacle, I.

In the tube D, just below the bottom of the vessel A, is a valve, F, of any good construction, to prevent the flow of water or air up into the tube D.

In the side of the tube D, and just above and level with the bottom of the inner vessel, B, is an orifice, $b$, to draw off from the vessel whatever air or water may be in the vessel around the fruit.

E is a piston or plunger fitting closely in the tube D, and actuated by a stem passing upward through a close packing in the air-tight cover C.

The operation is as follows: The inner vessel is to be filled with the fruit or other substance to be preserved and water—the piston being inserted in the tube—and the stem passed through the cover that is placed on the vessel and secured air-tight. The outer vessel is then filled with water, submerging the inner vessel, which is not so high as the outside, and thereby furnishing an air-tight sealing. The piston is then slowly worked. At each downward pressure the water and air, if any, are driven down and out of the tube past the valve F, which restrains them from returning. Each movement of the piston causes a vacuum in the tube, and as it rises all the water and air in the inner vessel are drawn in, and the water sinks down in the tube, and the air is driven down to the valve F, whence they are expelled by the next downward movement of the piston. Theoretically a perfect vacuum would be created in the inner vessel containing the articles to be preserved, and practically so much of one as to keep them a long time from decay, and in a condition fit for food longer than in any other known way.

I claim—

The combination of the two vessels and the exhaust-tube having the aperture $b$ with the piston and valve, all constructed substantially as and for the purpose set forth.

DWIGHT E. SWEETSER.

Witnesses:
JAMES S. GRINNELL,
F. M. THOMPSON.